United States Patent
Iida et al.

(10) Patent No.: US 10,352,258 B2
(45) Date of Patent: Jul. 16, 2019

(54) CONTROL DEVICE FOR INTERNAL COMBUSTION ENGINE HAVING SUPERCHARGER

(71) Applicant: HONDA MOTOR CO., LTD., Tokyo (JP)

(72) Inventors: Tetsuya Iida, Wako (JP); Yuichi Masukake, Wako (JP); Masahiro Takeuchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 26 days.

(21) Appl. No.: 15/299,466

(22) Filed: Oct. 21, 2016

(65) Prior Publication Data

US 2017/0114736 A1 Apr. 27, 2017

(30) Foreign Application Priority Data

Oct. 23, 2015 (JP) .................................. 2015-208603

(51) Int. Cl.
*F02D 41/00* (2006.01)
*F02B 33/44* (2006.01)
(Continued)

(52) U.S. Cl.
CPC ........ *F02D 41/0007* (2013.01); *F02B 33/446* (2013.01); *F02D 11/105* (2013.01);
(Continued)

(58) Field of Classification Search
CPC ............... F02D 41/0007; F02D 41/107; F02D 41/0005; F02D 41/023; F02D 2200/021;
(Continued)

(56) References Cited

U.S. PATENT DOCUMENTS

| 5,454,360 A * | 10/1995 | Shimizu | ................ F02B 33/446 123/564 |
| 6,810,667 B2 * | 11/2004 | Jung | ....................... F02B 37/16 123/559.1 |

(Continued)

FOREIGN PATENT DOCUMENTS

| JP | 2001-280144 | 10/2001 |
| JP | 2003-193850 | 7/2003 |
| JP | 2017-040172 | 2/2017 |

OTHER PUBLICATIONS

Japanese Office Action for corresponding JP Application No. 2015-208603, dated Jul. 24, 2018 (w/ English machine translation).

(Continued)

*Primary Examiner* — David Hamaoui
(74) *Attorney, Agent, or Firm* — Mori & Ward, LLP

(57) ABSTRACT

A control device for an internal combustion engine includes a throttle valve opening degree detector, an air bypass valve controller, and a torque reduction controller. The throttle valve opening degree detector detects an opening degree of a throttle valve which is provided downstream with respect to a compressor of a supercharger. The air bypass valve controller opens an air bypass valve based on a reduction change in the opening degree of the detected throttle valve. The air bypass valve is configured to open and close a bypass path. The torque reduction controller controls the throttle valve to reduce the opening degree of the throttle valve while an automatic transmission connected to the internal combustion engine is in an acceleration shifting in order to execute a torque reduction control. The air bypass valve controller maintains the air bypass valve in a close state during the torque reduction control.

5 Claims, 8 Drawing Sheets

(51) Int. Cl.
*F02D 41/02* (2006.01)
*F02D 41/10* (2006.01)
*F02P 5/04* (2006.01)
*F02P 5/15* (2006.01)
*F02D 11/10* (2006.01)

(52) U.S. Cl.
CPC ....... *F02D 41/0005* (2013.01); *F02D 41/023* (2013.01); *F02D 41/107* (2013.01); *F02P 5/045* (2013.01); *F02P 5/15* (2013.01); *F02D 2200/021* (2013.01); *F02D 2200/0404* (2013.01); *F02D 2200/60* (2013.01); *F02D 2250/26* (2013.01); *F02P 5/1502* (2013.01); *Y02T 10/144* (2013.01); *Y02T 10/42* (2013.01)

(58) Field of Classification Search
CPC ..... F02D 2200/60; F02B 33/446; F02P 5/045; F02P 5/15
See application file for complete search history.

(56) References Cited

U.S. PATENT DOCUMENTS

| | | | | |
|---|---|---|---|---|
| 7,775,934 | B2 * | 8/2010 | Dickinson | F02D 37/02 477/102 |
| 8,161,743 | B2 * | 4/2012 | Okamura | F02B 37/16 123/561 |
| 9,091,202 | B2 * | 7/2015 | Styles | F02B 47/08 |
| 9,228,536 | B2 * | 1/2016 | zur Loye | F02M 21/0287 |
| 9,604,645 | B2 * | 3/2017 | Glugla | B60W 30/1884 |
| 10,138,824 | B2 * | 11/2018 | Ohisa | F02P 5/1516 |
| 2014/0260189 | A1 * | 9/2014 | Sendrea | F02B 37/14 60/273 |

OTHER PUBLICATIONS

Chinese Office Action for corresponding CN Application No. 201610916931.5, dated Sep. 29, 2018 (w/ English machine translation).

* cited by examiner

CONTROL DEVICE FOR INTERNAL COMBUSTION ENGINE HAVING SUPERCHARGER

CROSS-REFERENCE TO RELATED APPLICATIONS

The present application claims priority under 35 U.S.C. § 119 to Japanese Patent Application No. 2015-208603, filed Oct. 23, 2015, entitled "Control Device for Internal Combustion Engine." The contents of this application are incorporated herein by reference in their entirety.

BACKGROUND

1. Field

The present disclosure relates to a control device for an internal combustion engine.

2. Description of the Related Art

In an internal combustion engine that has a supercharger, in a case where a throttle valve arranged on a downstream side of a compressor is closed in a transition from a supercharging operation to a deceleration operation, a supercharging pressure on the downstream side of the compressor further rises between the compressor and the throttle valve, and an air flow amount that passes through the compressor is reduced. Thus, a surge (hereinafter referred to as "deceleration surge") in which the air flows backward from the downstream side to an upstream side of the compressor occurs and causes malfunctions such as occurrences of abnormal noises and vibrations and adverse influences on components of the compressor.

Japanese Unexamined Patent Application Publication No. 2001-280144 discloses a control device in related art for inhibiting the deceleration surge. The control device detects the opening degree of the throttle valve and calculates the change amount of the opening degree. Then, in a case where the calculated change amount of the opening degree of the throttle valve in a close direction is greater than a prescribed value, an air bypass valve is opened. Accordingly, the raised pressure on the downstream side of the compressor is released to the upstream side of the compressor via a bypass path and is decreased, and the deceleration surge is thereby inhibited.

SUMMARY

According to a first aspect of the present invention, a control device for an internal combustion engine that is installed in a vehicle, is connected with a multi-speed automatic transmission, and has a compressor of a supercharger which is provided in an intake path and an air bypass valve which opens or closes a bypass path which bypasses the compressor, the control device includes a throttle valve opening degree detection unit, an air bypass valve control unit, and a torque reduction control unit. The throttle valve opening degree detection unit detects an opening degree of a throttle valve which is arranged on a downstream side of the compressor in the intake path. The air bypass valve control unit opens the air bypass valve based on a change state of the detected opening degree of the throttle valve in a close direction. The torque reduction control unit controls the throttle valve in the close direction in acceleration shifting of the automatic transmission to execute torque reduction control which reduces a torque of the internal combustion engine. The air bypass valve control unit maintains the air bypass valve in a close state in execution of the torque reduction control regardless of the change state of the opening degree of the throttle valve in the close direction.

According to a second aspect of the present invention, a control device for an internal combustion engine includes a throttle valve opening degree detector, an air bypass valve controller, and a torque reduction controller. The throttle valve opening degree detector detects an opening degree of a throttle valve which is provided downstream with respect to a compressor of a supercharger provided in an intake path of the internal combustion engine which is provided in a vehicle. The air bypass valve controller opens an air bypass valve based on a reduction change in the opening degree of the throttle valve detected by the throttle valve opening degree detector. The air bypass valve is configured to open and close a bypass path which bypasses the compressor. The torque reduction controller controls the throttle valve to reduce the opening degree of the throttle valve while an automatic transmission connected to the internal combustion engine is in an acceleration shifting in order to execute a torque reduction control in which a torque generated by the internal combustion engine is reduced. The air bypass valve controller maintains the air bypass valve in a close state during the torque reduction control regardless of the reduction change in the opening degree of the throttle valve.

According to a third aspect of the present invention, a control device for an internal combustion engine includes a throttle valve opening degree detector and circuitry. The throttle valve opening degree detector detects an opening degree of a throttle valve which is provided downstream with respect to a compressor of a supercharger provided in an intake path of the internal combustion engine which is provided in a vehicle. The circuitry configured to open an air bypass valve based on a reduction change in the opening degree of the throttle valve detected by the throttle valve opening degree detector. The air bypass valve is configured to open and close a bypass path which bypasses the compressor. The circuitry configured to control the throttle valve to reduce the opening degree of the throttle valve while an automatic transmission connected to the internal combustion engine is in an acceleration shifting in order to execute a torque reduction control in which a torque generated by the internal combustion engine is reduced. The circuitry configured to maintain the air bypass valve in a close state during the torque reduction control regardless of the reduction change in the opening degree of the throttle valve.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
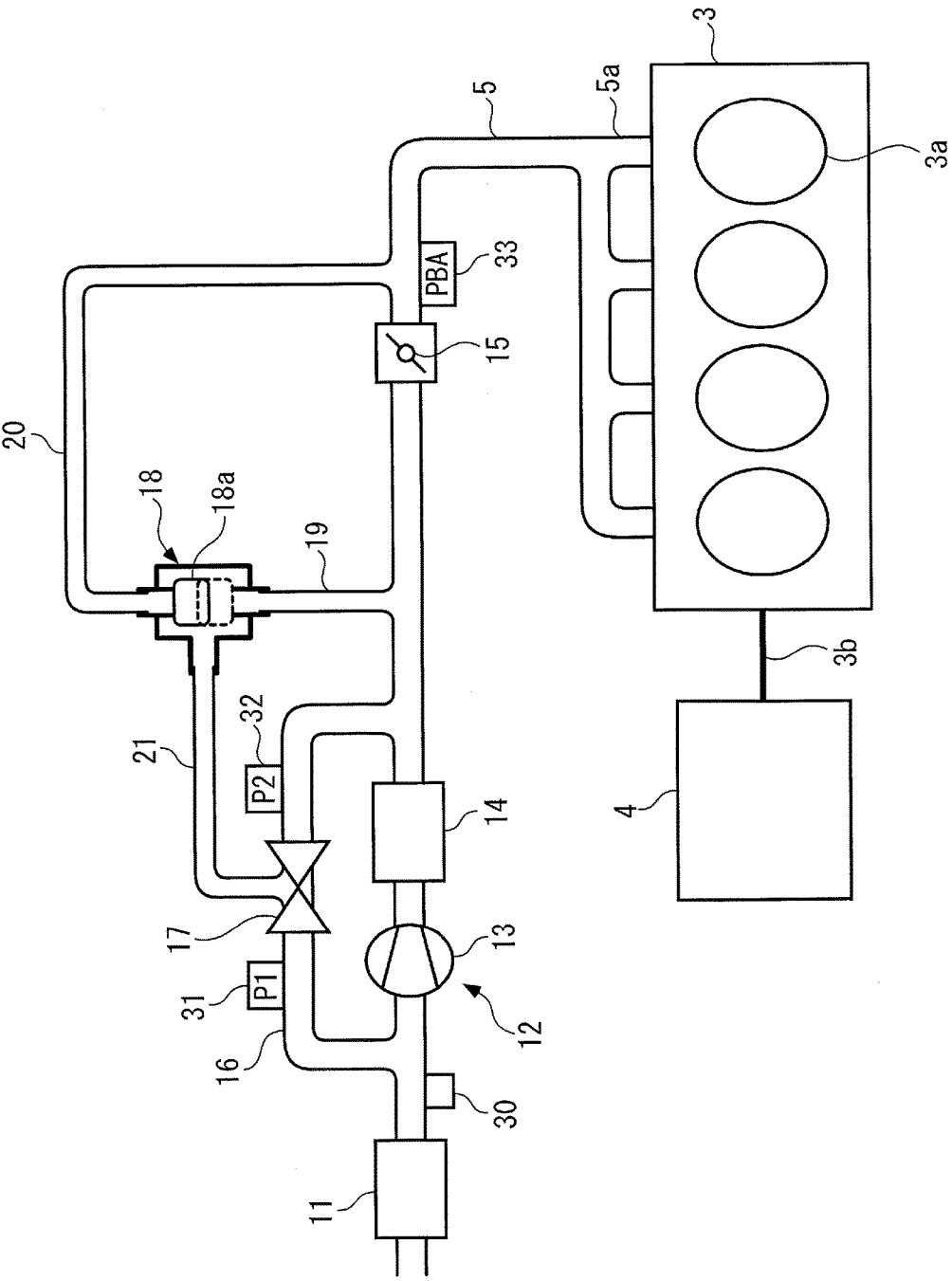
FIG. 1 is a diagram that schematically illustrates a configuration of an internal combustion engine to which the techniques of the present disclosure are applied.

The embodiments will now be described with reference to the accompanying drawings, wherein like reference numerals designate corresponding or identical elements throughout the various drawings.

Figure 2:
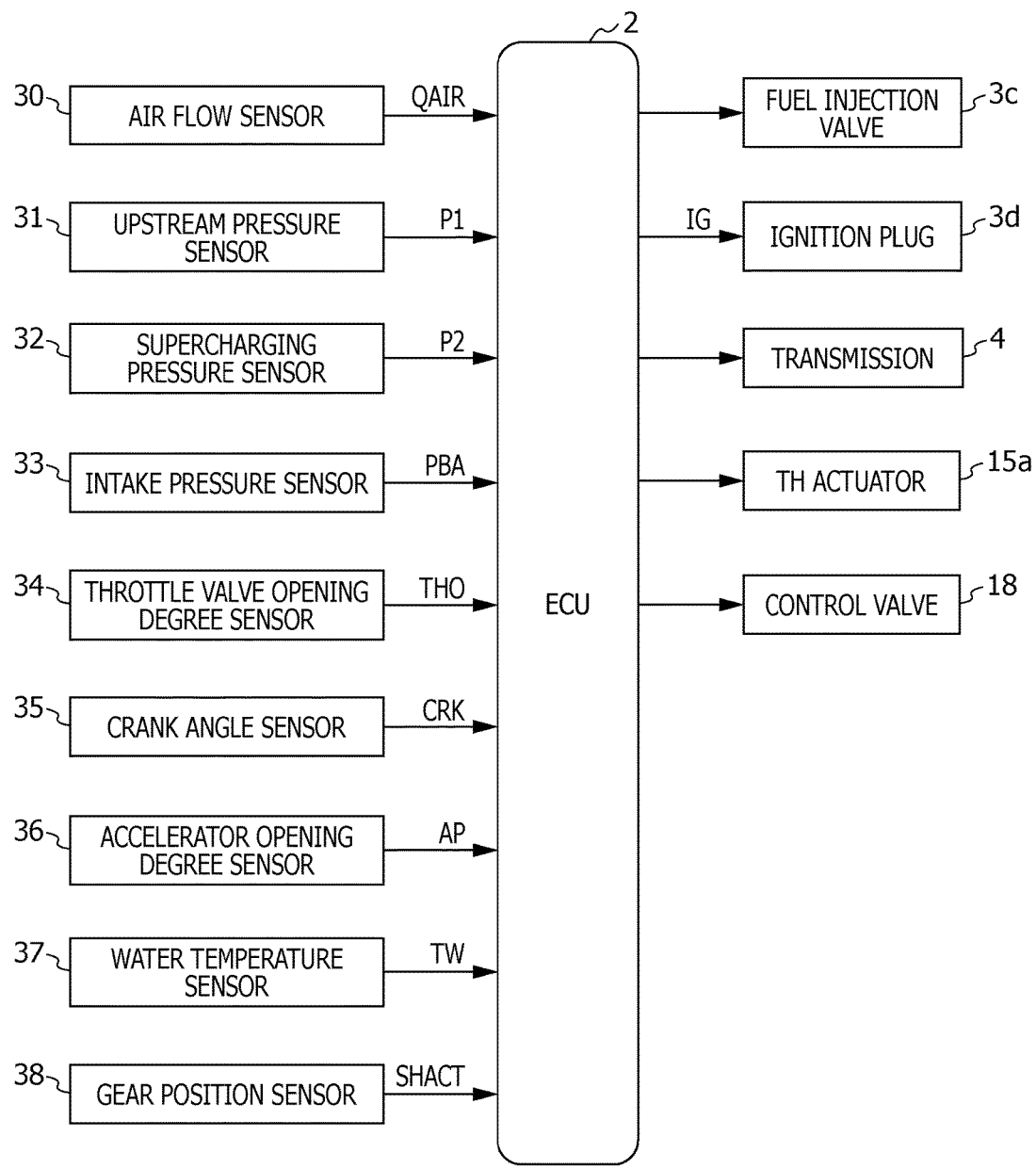
FIG. 2 is a block diagram that illustrates a schematic configuration of a control device.

A preferable embodiment of the present disclosure will hereinafter be described with reference to drawings. As illustrated in FIG. 1, an internal combustion engine (hereinafter referred to as "engine") 3 to which the techniques of the present disclosure are applied is an in-line four-cylinder engine that has four cylinders 3a, for example, and an operation of the engine 3 is controlled by an ECU 2 described later. The engine 3 is installed in a vehicle (not illustrated) and is connected with a transmission 4 via a crankshaft 3b as an output shaft. Further, in the engine 3, a fuel injection valve 3c and an ignition plug 3d are provided to each of the cylinders 3a (see FIG. 2), and a fuel injection amount of the fuel injection valve 3c and an ignition timing IG of the ignition plug 3d are controlled by the ECU 2.

An intake path 5 is connected with each of the cylinders 3a via an intake manifold 5a. In the intake path 5, an air cleaner 11, a compressor 13 of a turbocharger 12, an inter-cooler 14, and a throttle valve 15 are arranged in this order from the upstream side. The compressor 13 is mechanically coupled with a turbine (not illustrated) of the turbocharger 12 arranged in an exhaust path (not illustrated), rotates together with the turbine in response to the rotation and drive of the turbine by exhaust gas that flows through the exhaust path, and thereby performs a supercharging operation for supercharging with air (fresh air). The inter-cooler 14 cools the air whose temperature rises due to the supercharging operation of the compressor 13.

The throttle valve 15 is rotatably provided in the intake path 5. An opening degree (hereinafter referred to as "throttle valve opening degree") THO of the throttle valve 15 is controlled via a TH actuator 15a (see FIG. 2) in accordance with a control signal from the ECU 2, and the air amount that passes through the throttle valve 15 is thereby controlled.

Further, an air bypass path 16 is connected with the intake path 5. The air bypass path 16 is connected with the upstream side of the compressor 13 and with the downstream side of the inter-cooler 14 across those. The air bypass path 16 is provided with an air bypass valve 17 that opens or closes the air bypass path 16. Further, an electromagnetic control valve 18 for control opening and closing thereof is connected with the air bypass valve 17.

Although not illustrated, the air bypass valve 17 is configured with a diaphragm, a valve disc that is coupled with the diaphragm via a rod, a pressure chamber that is demarcated on a back surface side of the diaphragm, a valve spring that is arranged in the pressure chamber and urges the valve disc to the valve closing side via the diaphragm, and so forth.

The control valve 18 is connected between a connection portion on the downstream side of the air bypass path 16 and the throttle valve 15 in the intake path 5 via a first communication path 19, is connected with the downstream side of the throttle valve 15 in the intake path 5 via a second communication path 20, and communicates with the pressure chamber of the air bypass valve 17 via a third communication path 21. Further, the control valve 18 has a valve disc 18a that is driven by a solenoid (not illustrated). Turning on or off (excited or non-excited) of the solenoid of the control valve 18 is controlled by a control signal from the ECU 2 (see FIG. 2), the valve disc 18a is driven in accordance with the control signal, and the open or close of the air bypass valve 17 is thereby controlled.

For example, in a supercharging operation of the engine 3, the throttle valve 15 is opened, the solenoid of the control valve 18 is turned on, and the valve disc 18a is thereby driven to a first position (the position indicated by the solid line in FIG. 1) in which the first communication path 19 is opened and at the same time the second communication path 20 is closed. Accordingly, a supercharging pressure P2 at a high pressure is introduced from the downstream side of the compressor 13 to the pressure chamber of the air bypass valve 17 via the opened first communication path 19, the control valve 18, and the third communication path 21, presses the valve disc of the air bypass valve 17 to move the valve disc to a valve closing position, and thereby closes the air bypass valve 17.

On the other hand, in a deceleration operation of the engine 3, the throttle valve 15 is closed, the solenoid of the control valve 18 is turned off, and the valve disc 18a is thereby driven to a second position (the position indicated by the broken line in FIG. 1) in which the first communication path 19 is closed and at the same time the second communication path 20 is opened. Accordingly, an intake pressure PBA at a negative pressure is introduced from the downstream side of the throttle valve 15 to the pressure chamber of the air bypass valve 17 via the opened second communication path 20, the control valve 18, and the third communication path 21, draws the valve disc against an urging force of the valve spring to move the valve disc to a valve opening position, and thereby opens the air bypass valve 17.

An air flow sensor 30 is provided on the immediately downstream side of the air cleaner 11 in the intake path 5. The air flow sensor 30 detects the flow amount (air flow amount) QA of the air that flows through a placement portion of the air flow sensor 30 and outputs a detection signal thereof to the ECU 2. Further, in the air bypass path 16, an upstream pressure sensor 31 and a supercharging pressure sensor 32 are respectively provided on both of the sides of the air bypass valve 17. An intake pressure sensor 33 is provided on the downstream side of the throttle valve 15 in the intake path 5. Those pressure sensors 31 to 33 detect the pressures of the respective placement positions as a compressor upstream pressure P1, the supercharging pressure P2, and the intake pressure PBA and output detection signals thereof to the ECU 2.

Further, the throttle valve opening degree THO is detected by a throttle valve opening degree sensor 34, and a detection signal thereof is output to the ECU 2. In addition, the engine 3 is provided with a crank angle sensor 35. The crank angle sensor 35 outputs a CRK signal as a pulse signal with respect to each prescribed crank angle to the ECU 2 in response to the rotation of the crankshaft 3b. The ECU 2 calculates a revolution speed (hereinafter referred to as "engine speed") NE of the engine 3 based on the CRK signal.

Further, the ECU 2 receives an output of a detection signal that indicates a pedal stroke (hereinafter referred to as "accelerator opening degree") AP on an accelerator pedal (not illustrated) of the vehicle from an accelerator opening degree sensor 36 and receives an output of a detection signal of a temperature (hereinafter referred to as "engine water temperature") TW of cooling water of the engine 3 from a water temperature sensor 37.

The transmission 4 connected with the engine 3 is a multi-speed automatic transmission of a dual clutch type and is configured to set one gear position from plural gear positions while switching two input systems of power of the engine 3 by two clutches. Operations of the transmission 4 that include the switching by the clutches and the setting of the gear position are controlled by the ECU 2.

Further, because of the mechanism of the transmission 4, the engine speed NE on an input side has to be caused to match the revolution speed in accordance with the gear ratio of the gear position resulting from shifting while the shifting is performed. Thus, the ECU 2 performs control such that torque reduction control for reducing the torque of the engine 3 is executed in acceleration shifting (up-shifting) and torque increase control for increasing the torque of the engine 3 is executed in deceleration shifting (down-shifting). The torque increase control is intentionally intensively performed for rapidly increasing (urging) the engine speed NE particularly in sport mode driving. Further, the transmission 4 is provided with a gear position sensor 38 that detects an actual gear position SHACT which is presently set, and a detection signal of the gear position sensor 38 is output to the ECU 2.

The ECU 2 is configured with a microcomputer formed with a CPU, a RAM, a ROM, an I/O interface (all not illustrated), and so forth. The ECU 2 makes determinations about operation states of the engine 3 and the transmission 4 in accordance with the detection signals of the above-described various sensors 30 to 38 and so forth and executes various kinds of control processes that are targeted on the engine 3 and the transmission 4 in accordance with the determined operation states and by following programs that are stored in the ROM. In this embodiment, the ECU 2 corresponds to an air bypass valve control unit, a torque reduction control unit, a driver requesting torque parameter calculation unit, an internal combustion engine requesting torque parameter calculation unit, a torque reduction control determination unit, a torque increase control unit, and a torque increase control determination unit.

Figure 3:
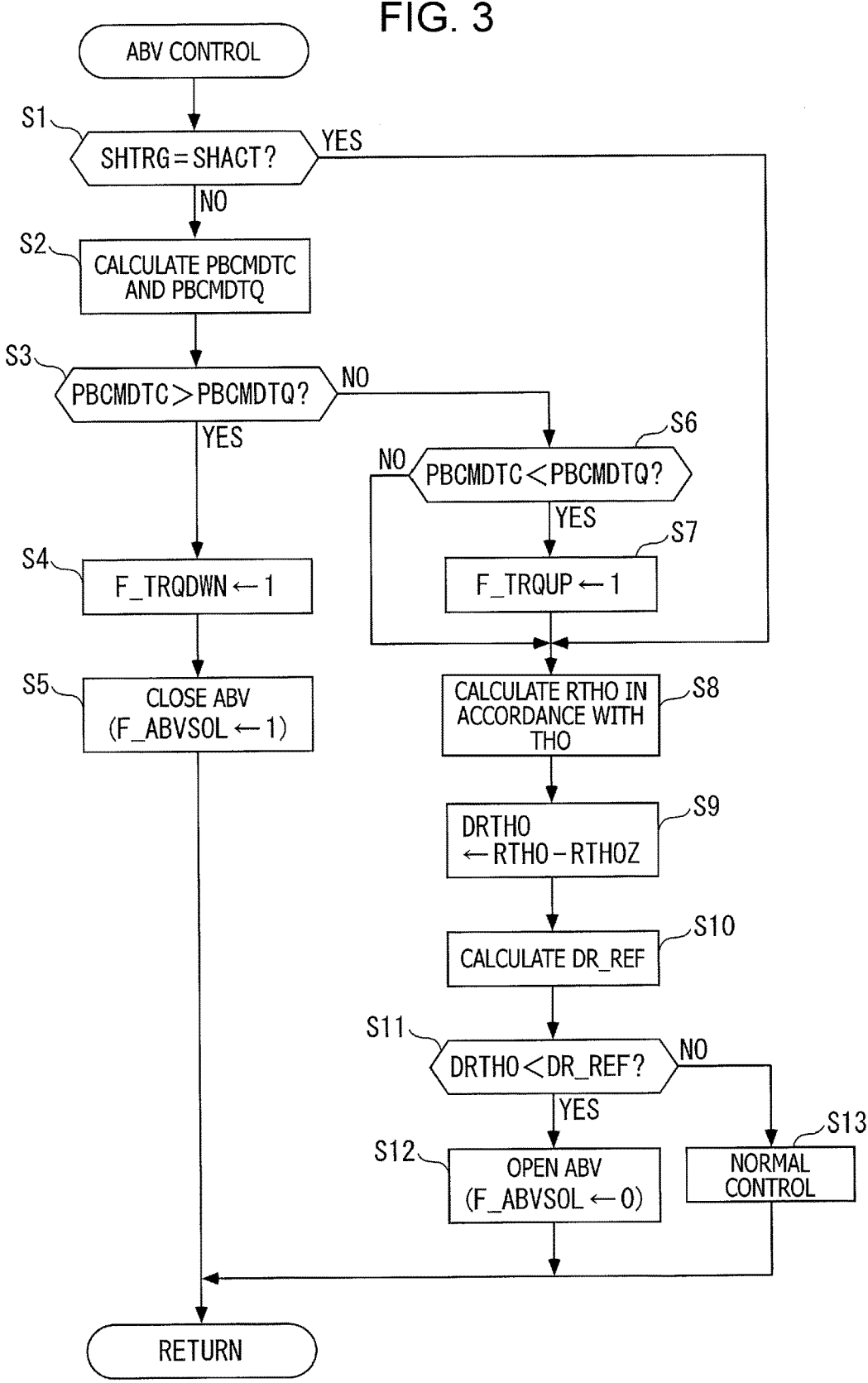
FIG. 3 is a flowchart that illustrates a control process of an air bypass valve.

FIG. 3 is a flowchart that illustrates an air bypass valve control process for controlling open and close of the air bypass valve 17, which is executed by the ECU 2. The air bypass valve control process includes a deceleration surge control for inhibiting the deceleration surge. A basic concept of the deceleration surge control will be described below with reference to FIG. 4.

The deceleration surge is more likely to occur as the difference between the pressure (supercharging pressure P2) on the downstream side of the compressor 13 and the pressure (compressor upstream pressure P1) on the upstream side is greater and as a flow amount (hereinafter referred to as "compressor flow amount") QAIRCOM of air that passes through the compressor 13 is less. Accordingly, in the coordinate plane in which the horizontal axis represents the compressor flow amount QAIRCOM and the vertical axis represents an upstream-downstream pressure ratio P2/P1 of the compressor 13, a surge area in which the deceleration surge occurs is indicated as FIG. 4, for example.

Further, in a case where the internal combustion engine decelerates, the compressor flow amount QAIRCOM decreases, and an operating point of the internal combustion engine moves toward the surge area like arrow A, for example. In the deceleration surge control by this process, the change rate of the compressor flow amount QAIRCOM is predicted from the change state of the throttle valve opening degree THO, the air bypass valve 17 is opened at an operating point close to the surge area (for example, x sign in FIG. 4), the operating point is thereby stopped from entering the surge area, and the deceleration surge is inhibited.

The air bypass valve control process of FIG. 3 is repeatedly executed in a prescribed cycle. In this process, first in step 1 (indicated as "S1" in FIG. 3 and the same applies to the other steps), a determination is made whether or not a target gear position SHTRG of the transmission 4 corresponds with the actual gear position SHACT that is detected by the gear position sensor 38. The target gear position SHTRG is set based on the accelerator opening degree AP, the engine speed NE, and so forth. In a case where the answer in step 1 is NO, a determination is made that the transmission 4 is shifting, and the process moves to step 2.

In step 2, a first target intake pressure PBCMDTC and a second target intake pressure PBCMDTQ are calculated. The first target intake pressure PBCMDTC is a parameter that represents the driver requesting torque which is requested by a driver of the vehicle and is calculated by performing a search on a prescribed map (not illustrated) based on the driver requesting torque. The driver requesting torque is calculated based on the accelerator opening degree AP.

The second target intake pressure PBCMDTQ is a parameter that represents an engine requesting torque which is requested by the engine 3 and is calculated by performing a search on a prescribed map (not illustrated) based on the engine requesting torque. The engine requesting torque reflects all the torques requested by the engine 3 such as a torque that is increased or reduced for traction control, for example, in addition to the above driver requesting torque, the torque that is increased or reduced for the torque reduction control and the torque increase control in the shifting of the transmission 4, which are described above.

In step 3, a determination is made whether or not the first target intake pressure PBCMDTC is higher than the second target intake pressure PBCMDTQ. In a case where the answer is YES and PBCMDTC>PBCMDTQ, a determination is made that the torque reduction control in the acceleration shifting of the transmission 4 is being executed. In order to indicate this situation, a torque reduction control flag F_TRQDWN is set to "1" (step 4), the air bypass valve 17 is closed (step 5), and the process is finished. This closing of the air bypass valve 17 is performed by setting a control valve flag F_ABVSOL to "1", turning on the solenoid of the control valve 18 in response to the setting, and driving the valve disc 18a to the first position (the position indicated by the solid line in FIG. 1).

On the other hand, in a case where the answer in step 3 is NO, a determination is made whether or not the first target intake pressure PBCMDTC is lower than the second target intake pressure PBCMDTQ (step 6). In a case where the answer is YES and PBCMDTC<PBCMDTQ, a determination is made that the torque increase control in the deceleration shifting of the transmission 4 is being executed. In order to indicate this situation, a torque increase control flag F_TRQUP is set to "1" (step 7), and the process thereafter moves to step 8 and subsequent steps to make a determination about the deceleration surge.

Figure 5:
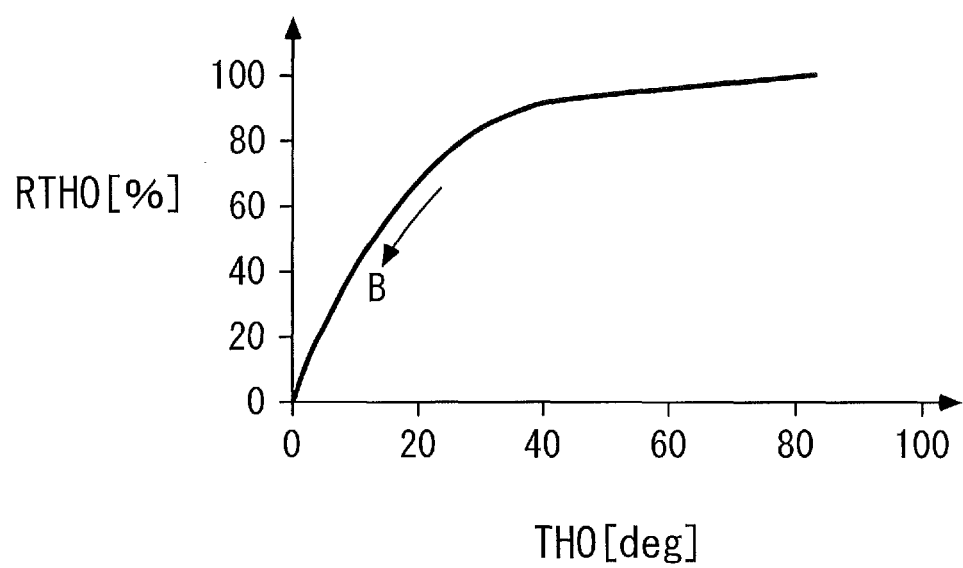
FIG. 5 is a map for calculating a flow ratio in accordance with an opening degree of a throttle valve.

Further, in a case where the answer in step 6 is NO and PBCMDTC=PBCMDTQ or where the answer in above step 1 is YES and the transmission 4 is not shifting, the process moves to step 8 and subsequent steps. In this step 8, a search is performed on a map illustrated in FIG. 5 in accordance with the detected throttle valve opening degree THO, and a flow ratio RTHO is thereby calculated. The flow ratio RTHO represents the ratio between the air flow amount that is obtained at the throttle valve opening degree THO and the air flow amount that is obtained in a case where the throttle valve opening degree THO is an effective opening degree (approximately 83 deg in this example).

Next, in step 9, the difference (RTHO−RTHOZ) between the flow ratio RTHO calculated in above step 8 and a previous value RTHOZ is calculated as a flow change rate DRTHO. Based on the above definition, the flow change rate DRTHO corresponds to the change amount of the flow ratio RTHO between the present time and the previous time and thus becomes a negative value in a case where the throttle valve opening degree THO is reduced like arrow B in FIG. 5.

Next, in step 10, a threshold value DR_REF for the determination about the surge is calculated. The threshold value DR_REF is used for prediction and determination about an occurrence of the deceleration surge by comparison with the flow change rate DRTHO. The threshold value DR_REF is calculated by performing a search on a prescribed map (not illustrated) in accordance with the compressor flow amount QAIRCOM, for example. The compressor flow amount QAIRCOM is calculated based on an air flow amount QAIR that is detected by the air flow sensor 30.

Figure 4:
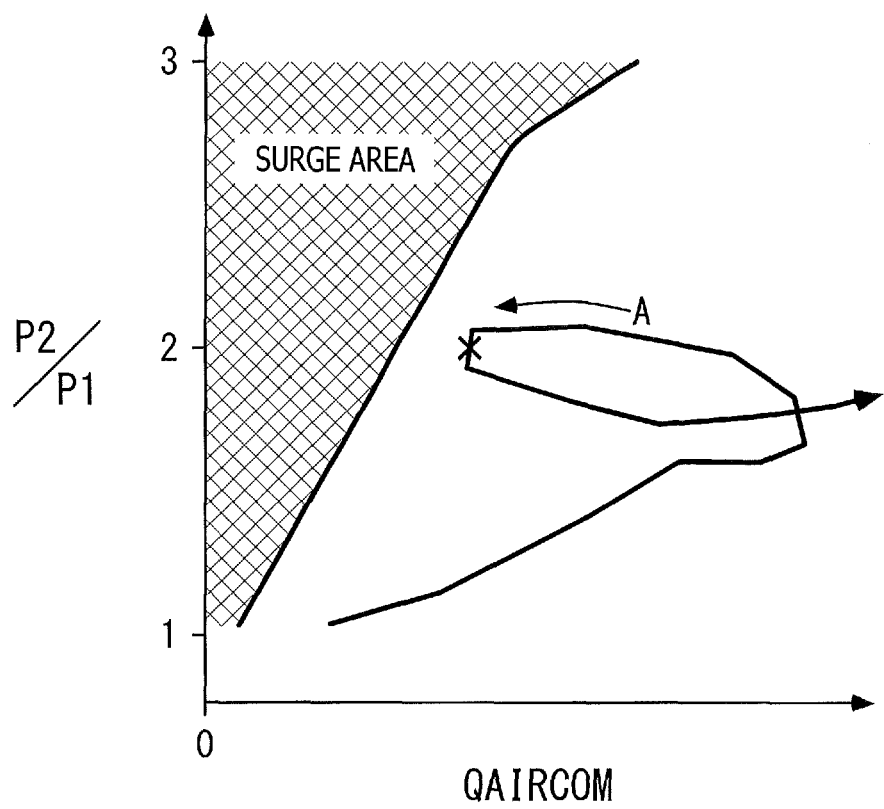
FIG. 4 is a diagram for explaining a basic concept of deceleration surge control.

Further, although not illustrated, the threshold value DR_REF is set as a negative value on the above map and is set as a less value (which is a greater value as an absolute value) because the deceleration surge is less likely to occur as the compressor flow amount QAIRCOM becomes greater (see FIG. 4).

Next, in step 11, a determination is made whether or not the flow change rate DRTHO that is calculated in above step 9 is lower than the threshold value DR_REF. In a case where the answer is YES and DRTHO<DR_REF, the deceleration surge may occur because the change rate of the compressor flow amount QAIRCOM in a reducing direction is high. Thus, the air bypass valve 17 is opened (step 12), and the process is finished.

This opening of the air bypass valve 17 is performed by setting the control valve flag F_ABVSOL to "0", turning off the solenoid of the control valve 18 in response to the setting, and driving the valve disc 18a to the second position (the position indicated by the broken line in FIG. 1). The air bypass valve 17 is opened, the pressure on the downstream side of the compressor 13 is thereby released to the upstream side of the compressor 13 via the air bypass path 16, and the deceleration surge is thereby inhibited.

On the other hand, in a case where the answer in step 11 is NO and DRTHO≥DR_REF, a determination is made that the deceleration surge does not occur because the change rate of the compressor flow amount QAIRCOM in the reducing direction is low. Normal control is executed in step 13, and the process is thereafter finished. As described above, in the normal control, the air bypass valve 17 is closed in the supercharging operation and is opened in the deceleration operation, for example.

Figure 6:
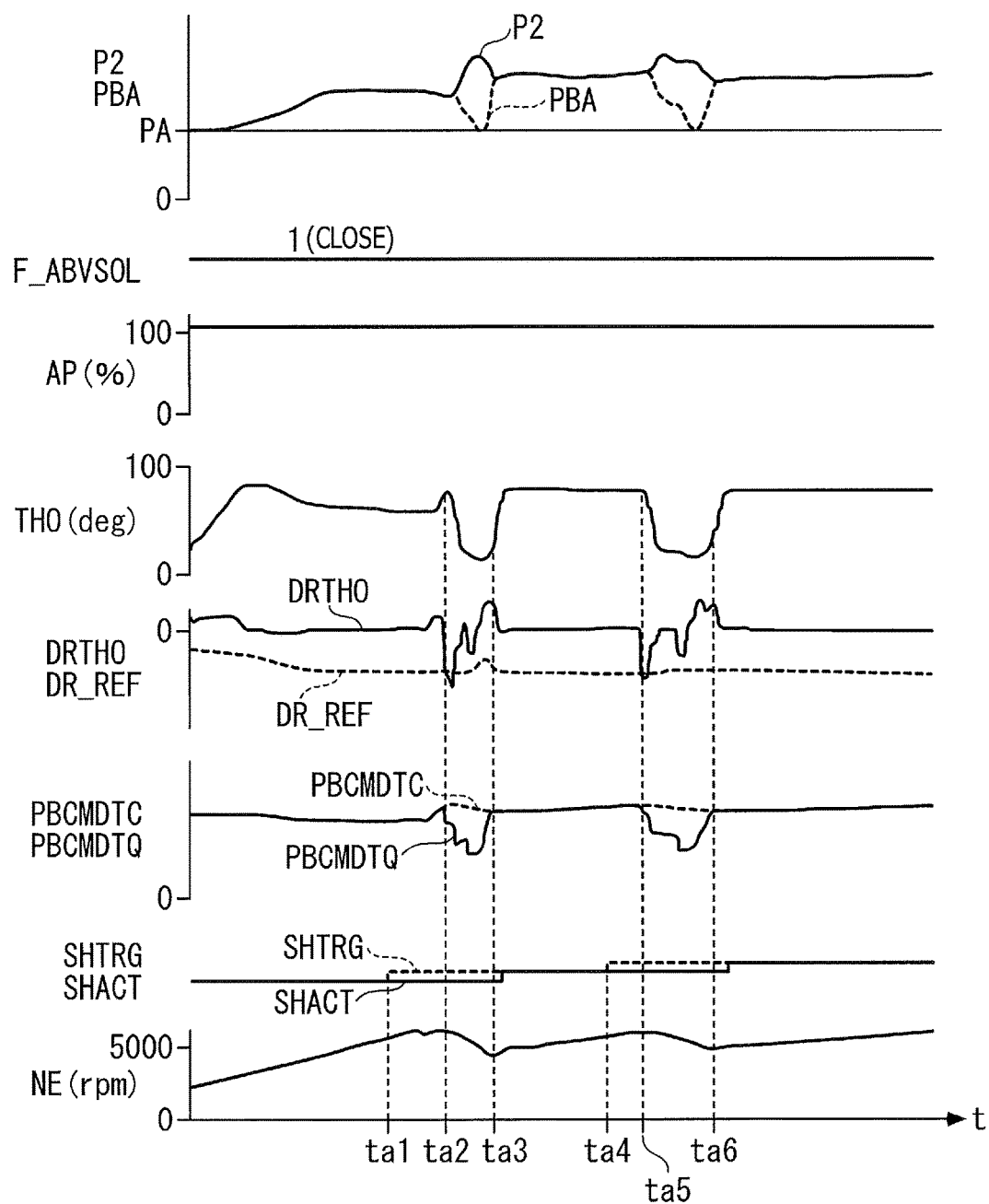
FIG. 6 is a timing diagram that illustrates an operation example that is obtained by an air bypass valve control process.

Next, operation examples that are obtained by the above-described air bypass valve control process will be described with reference to FIGS. 6 to 8. FIG. 6 illustrates an example in which the acceleration shifting (up-shifting) of the transmission 4 is performed in a state where the driver requests the torque (accelerator opening degree AP=100%). In this example, because the torque is requested, the supercharging operation is performed in the normal control and in a state where, in principle, the control valve flag F_ABVSOL is set to "1" and the air bypass valve 17 is closed.

In a case where the target gear position SHTRG is changed to a high speed side at a time ta1 from the above state, the target gear position SHTRG does not correspond with the actual gear position SHACT, and the acceleration shifting of the transmission 4 is started. Further, in the acceleration shifting, the torque reduction control by control of the throttle valve 15 in the close direction is executed between times ta2 and ta3. In response thereto, the throttle valve opening degree THO is reduced, and the flow change rate DRTHO decreases in response to the reduction.

Meanwhile, because the driver requesting torque does not change although the engine requesting torque is usually reduced in the torque reduction control, the second target intake pressure PBCMDTQ based on the engine requesting torque becomes lower than the first target intake pressure PBCMDTC based on the driver requesting torque. Thus, the answer in step 1 in FIG. 3 becomes NO and the answer in step 3 becomes YES, and steps 4 and 5 are executed in response to the answers. Accordingly, the torque reduction control flag F_TRQDWN is set to "1", the control valve flag F_ABVSOL is set to "1", and the air bypass valve 17 is maintained in a close state.

Thus, even in a case where the flow change rate DRTHO decreases in response to the reduction in the throttle valve opening degree THO and becomes lower than the threshold value DR_REF in the torque reduction control, the air bypass valve 17 is not opened and is maintained in the close state.

When the acceleration shifting is completed, the actual gear position SHACT corresponds with the target gear position SHTRG. Subsequently, second up-shifting is performed (times ta4 to ta6), and the up-shifting operation is the same as the above-described first operation.

Figure 7:
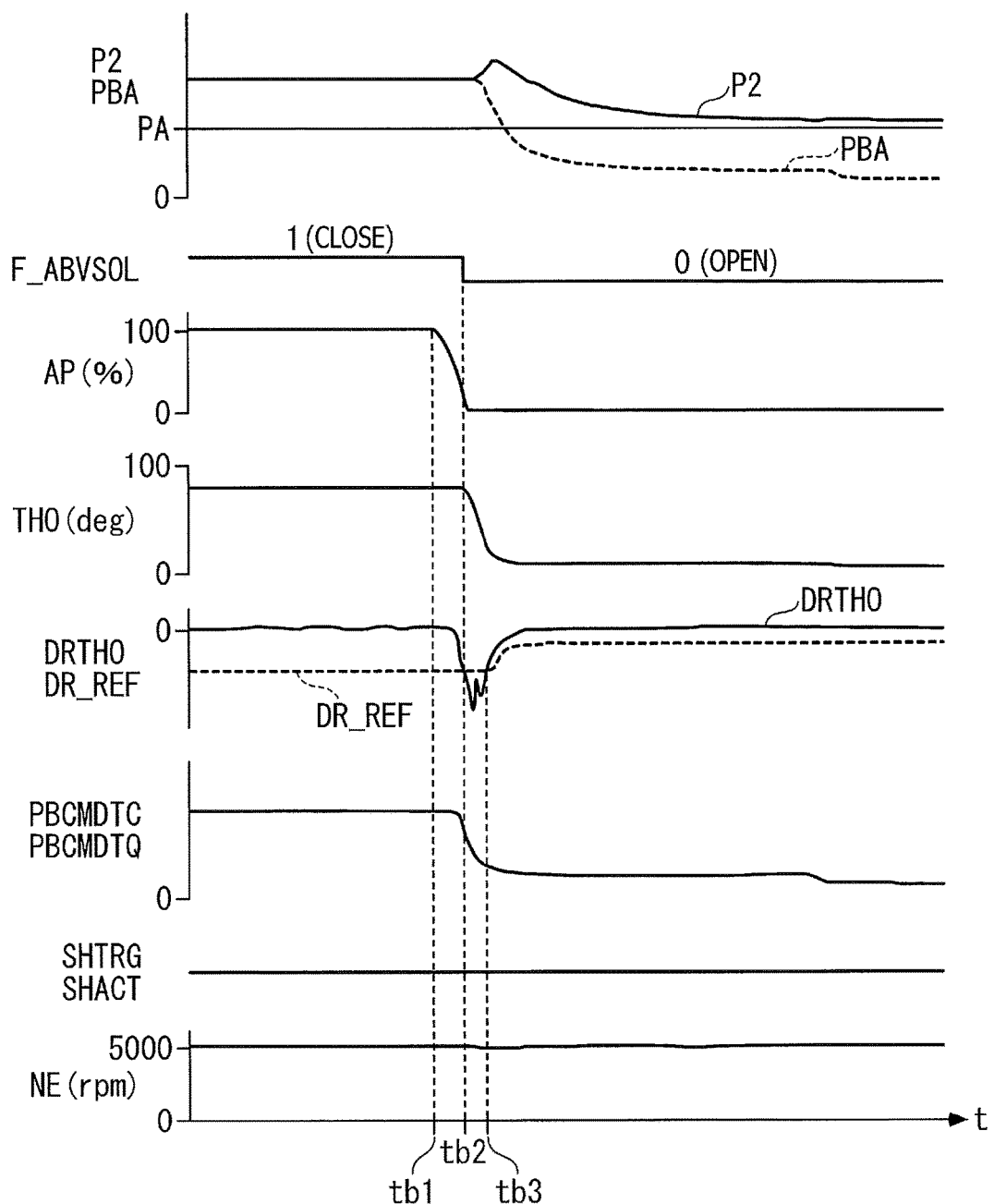
FIG. 7 is a timing diagram that illustrates another operation example that is obtained by the air bypass valve control process.

FIG. 7 is an example in which the driver requests deceleration (torque reduction) and shifting of the transmission 4 is not performed. Before a time tb1 at which a deceleration request is made, the supercharging operation is performed in a state where the accelerator opening degree AP is almost continuously 100%, the control valve flag F_ABVSOL is set to "1", and the air bypass valve 17 is closed. Further, the throttle valve 15 is almost continuously in a fully open state, and the flow change rate DRTHO is almost zero in response to the state.

When the accelerator opening degree AP starts to be reduced (time tb1) and is reduced to zero due to the deceleration request from the above state, the throttle valve opening degree THO is reduced slightly later than that, and the flow change rate DRTHO decreases in response to the reduction.

Meanwhile, the reduction request of the torque in this case is reflected by both of the driver requesting torque and the engine requesting torque. Unless another torque is requested from the engine 3, the first target intake pressure PBCMDTC and the second target intake pressure PBCMDTQ are mutually equivalent. Accordingly, the answer in step 3 in FIG. 3 becomes NO. Otherwise, even in a case where the target intake pressures PBCMDTC and PBCMDTQ are not mutually equivalent because another torque is requested from the engine 3, in this example, the target gear position SHTRG and the actual gear position SHACT are continuously equivalent because shifting of the transmission 4 is not performed, and the answer in step 1 in FIG. 3 becomes YES.

As a result of the above, steps 4 and 5 are not executed, and a determination about the deceleration surge is made in step 8 and subsequent steps.

Further, when the flow change rate DRTHO that decreases in response to the reduction in the throttle valve opening degree THO becomes lower than the threshold value DR_REF (time tb2), step 12 is executed. Accordingly, the control valve flag F_ABVSOL is switched to "0", the air bypass valve 17 is opened, and the deceleration surge is thereby inhibited. Subsequently, after the flow change rate DRTHO is restored and becomes the threshold value DR_REF or more at a time tb3, the air bypass valve 17 is maintained in the open state, and the deceleration operation is performed.

Figure 8:
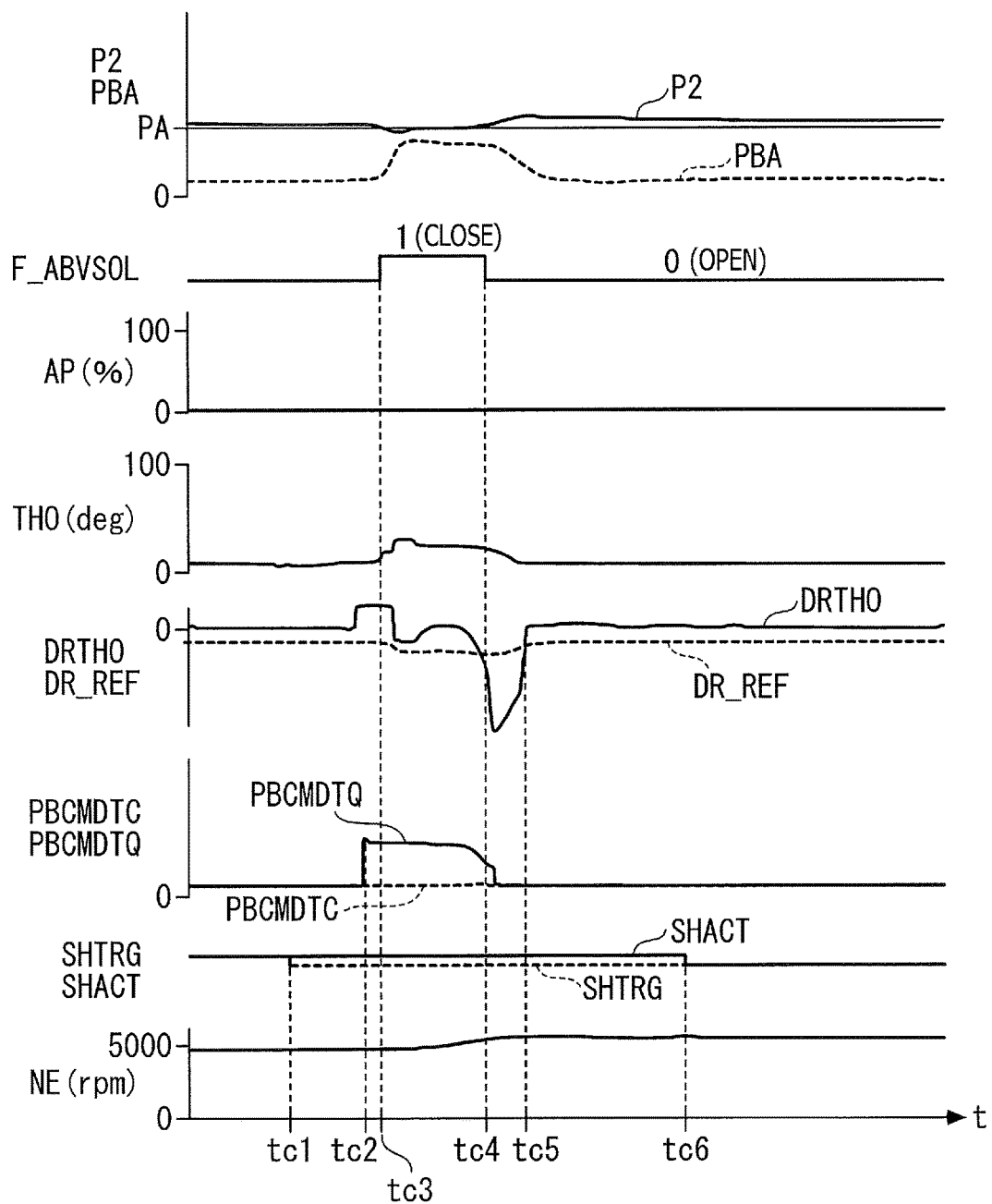
FIG. 8 is a timing diagram that illustrates still another operation example that is obtained by the air bypass valve control process.

FIG. 8 illustrates an example in which the deceleration shifting (down-shifting) of the transmission 4 is performed in a state where the driver does not request the torque (AP=0). In this example, because the torque is not requested, the deceleration operation is performed in the normal control and in a state where, in principle, the control valve flag F_ABVSOL is set to "0" and the air bypass valve 17 is opened. The throttle valve opening degree THO is controlled to a small opening degree close to zero.

In a case where the target gear position SHTRG is changed to a low speed side at a time tc1 from the above state, the target gear position SHTRG does not correspond with the actual gear position SHACT, and the deceleration shifting of the transmission 4 is started. Further, in the deceleration shifting, the torque increase control by control of the throttle valve 15 in an open direction is executed between close points to times tc2 to tc4. Accordingly, the control valve flag F_ABVSOL is switched to "1" at a time tc3, and the air bypass valve 17 is temporarily closed. Further, the flow change rate DRTHO increases in response to the increase in the throttle valve opening degree THO.

Meanwhile, because the driver requesting torque does not change although the engine requesting torque increases in the torque increase control, the second target intake pressure PBCMDTQ becomes higher than the first target intake pressure PBCMDTC. As a result, the answer in step 3 in FIG. 3 becomes NO, and steps 4 and 5 are thereby not executed. The answer in step 6 becomes YES, and a determination about the deceleration surge is thereby made in step 8 and subsequent steps after the torque increase control flag F_TRQUP is set to "1".

Subsequently, as the torque increase control moves toward a finish, the throttle valve opening degree THO is reduced. When the flow change rate DRTHO that decreases in response to the reduction becomes lower than the threshold value DR_REF (time tc4), step 12 in FIG. 3 is executed. Accordingly, the control valve flag F_ABVSOL is switched to "0", the air bypass valve 17 is opened, and the deceleration surge is thereby inhibited. Subsequently, after the flow change rate DRTHO is restored and becomes the threshold value DR_REF or more at a time tc5, the air bypass valve 17 is maintained in the open state, and the down-shifting is completed at a time tc6.

Next, a torque reduction control process that is executed in the acceleration shifting will be described with reference to FIG. 9. In this process, first in step 21, a determination is made whether or not a detected engine water temperature TW is higher than a prescribed temperature T_REF (for example, 65° C.). In a case where the answer is YES and the temperature of the engine 3 is relatively high, the ignition timing IG is controlled to a retard side (step 22), and the process finishes. On the other hand, in a case where the answer in step 21 is NO and the temperature of the engine 3 is relatively low, the throttle valve opening degree THO is controlled to a reduction side (step 23), and the process finishes.

Figure 10:
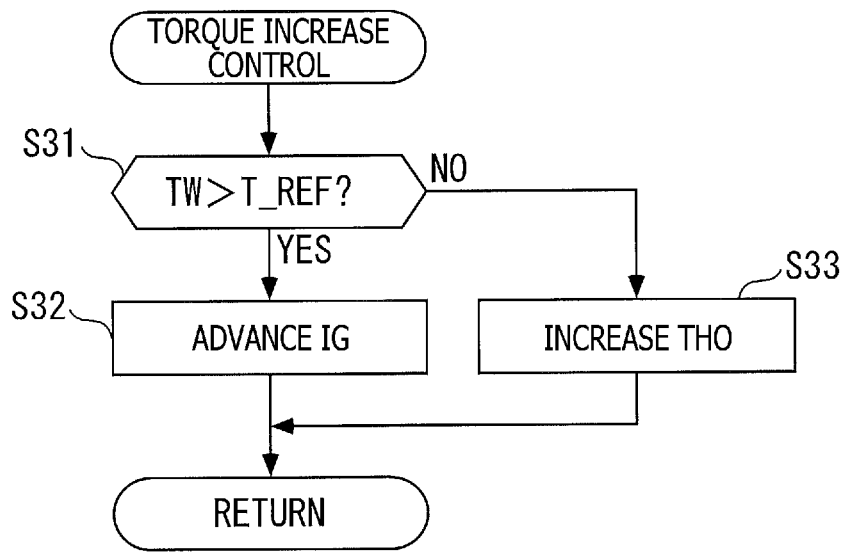
FIG. 10 is a flowchart that illustrates a torque increase control process.

Further, FIG. 10 illustrates a torque increase control process that is executed in the deceleration shifting. In this process, the ignition timing IG or the throttle valve opening degree THO is controlled in the opposite direction from the above-described torque reduction control in accordance with the engine water temperature TW, and the torque of the engine 3 is thereby increased. That is, in step 31, in a case where the engine water temperature TW is higher than the prescribed temperature T_REF (step 31: YES) and the temperature of the engine 3 is relatively high, the ignition timing IG is controlled to an advance side (step 32). On the other hand, in a case where the answer in step 31 is NO and the temperature of the engine 3 is relatively low, the throttle valve opening degree THO is controlled to an increase side (step 33).

As described above, in this embodiment, in the acceleration shifting of the transmission 4, the throttle valve 15 is controlled in the close direction, and the torque reduction control is thereby executed. In addition, in execution of the torque reduction control, the air bypass valve 17 is maintained in the close state regardless of the change amount of the throttle valve opening degree THO in the close direction. Accordingly, even in a case where the throttle valve opening degree THO is reduced due to the torque reduction control in the acceleration shifting, the air bypass valve 17 is not opened and is maintained in the close state, and sufficient acceleration performance may thus be secured in the acceleration shifting.

Further, in a condition in which the torque reduction control is not executed, the flow change rate DRTHO is calculated based on the change in the throttle valve opening degree THO in the close direction. Because the deceleration surge may occur in a case where the flow change rate DRTHO becomes lower than the threshold value DR_REF, the air bypass valve 17 is opened. Accordingly, the deceleration surge may appropriately be inhibited in deceleration.

Further, in a case where a condition in which the transmission 4 is shifting and a condition in which the first target intake pressure PBCMDTC based on the driver requesting torque is higher than the second target intake pressure PBCMDTQ based on the engine requesting torque are simultaneously satisfied, a determination is made that the torque reduction control in the acceleration shifting is being executed. Accordingly, the determination may accurately be made. Consequently, based on the result of the determination, appropriate selection may be made between use of close control of the air bypass valve 17 in the torque reduction control in the acceleration shifting and use of open control of the air bypass valve 17 for inhibiting the deceleration surge in conditions other than the torque reduction control.

Further, in a case where the condition in which the transmission 4 is shifting and the condition in which the first target intake pressure PBCMDTC is lower than the second target intake pressure PBCMDTQ are simultaneously satisfied, a determination is made that the torque increase control in the deceleration shifting is being executed. Accordingly, the determination may accurately be made.

In addition, in a case where the engine water temperature TW is higher than the prescribed temperature T_REF, retarding control of the ignition timing IG is executed as the torque reduction control. Accordingly, torque reduction of the engine 3 may be performed highly responsively. On the other hand, in a case where the engine water temperature TW is the prescribed temperature T_REF or lower, control of the throttle valve opening degree THO in the close direction is executed as the torque reduction control. Accordingly, an unstable combustion state in a case where the ignition timing IG is retarded in a low temperature state may be avoided, and the torque reduction control may stably be performed.

It should be noted that the techniques of the present disclosure are not limited to the described embodiment but may be practiced in various modes. For example, in the embodiment, a determination of whether or not the transmission 4 is shifting is made by comparison between the target gear position SHTRG and the actual gear position SHACT. However, the determination may be performed by other appropriate methods.

Further, in the embodiment, the first target intake pressure PBCMDTC based on the driver requesting torque and the second target intake pressure PBCMDTQ based on the engine requesting torque are respectively used as the driver requesting torque parameter and the internal combustion engine requesting torque parameter for a determination of whether or not the torque reduction control or the torque increase control is performed. Instead of those, other appropriate parameters may be used. For example, an intake air amount, a fuel injection amount, and so forth based on each of the driver requesting torque and the engine requesting torque may be used. Alternatively, the driver requesting torque and the engine requesting torque as themselves may be used.

Further, in the embodiment, the engine water temperature TW is used as a temperature parameter of the engine 3 in a case where schemes of the torque reduction control and the torque increase control are selected. However, other appropriate parameters, for example, an oil temperature of the engine 3 may be used. Further, a temperature parameter may be estimated from the operation state of the engine and so forth instead of detection of those temperature parameters by sensors.

In addition, in the embodiment, the transmission 4 is of the dual clutch type. However, the transmission 4 may be of another type as long as the transmission 4 is a multi-speed automatic transmission. Furthermore, specific configurations may appropriately be altered within the scope of the gist of the present disclosure.

A first aspect of the present disclosure provides a control device for an internal combustion engine 3 that is installed in a vehicle, is connected with a multi-speed automatic transmission (a transmission 4 in the embodiment (the same applies to the other reference characters in this section)), and has a compressor 13 of a supercharger (turbocharger 12) which is provided in an intake path 5 and an air bypass valve 17 which opens or closes a bypass path 16 which bypasses the compressor 13. The control device includes: a throttle valve opening degree detection unit (throttle valve opening degree sensor 34) that detects an opening degree (throttle valve opening degree THO) of a throttle valve 15 which is arranged on a downstream side of the compressor 13 in the intake path 5; an air bypass valve control unit (an ECU 2 and step 12 in FIG. 3) that opens the air bypass valve 17 based on a change state of the detected opening degree of the throttle valve 15 in a close direction; and a torque reduction control unit (the ECU 2 and step 23 in FIG. 9) that controls the throttle valve 15 in the close direction in acceleration shifting of the automatic transmission to execute torque reduction control which reduces a torque of the internal combustion engine 3, in which the air bypass valve control unit maintains the air bypass valve 17 in a close state in execution of the torque reduction control regardless of the change state of the opening degree of the throttle valve 15 in the close direction (steps 4 and 5 in FIG. 3).

The internal combustion engine is installed in the vehicle, is connected with the multi-speed automatic transmission, and has the compressor of the supercharger in the intake path and the air bypass valve which opens or closes an air bypass path for bypassing the compressor. In the control device for an internal combustion engine according to the present disclosure, the opening degree of the throttle valve arranged on the downstream side of the compressor in the intake path is detected, and the air bypass valve is opened based on the change state of the detected throttle valve opening degree in the close direction. Accordingly, in deceleration of the internal combustion engine, the air bypass valve is opened at an appropriate timing in accordance with a decrease state of an air flow amount in response to the reduction in the throttle valve opening degree, the pressure on the downstream side of the compressor is thereby released to the upstream side of the compressor via the air bypass path, and a deceleration surge is appropriately inhibited.

Further, in the acceleration shifting of the automatic transmission, the throttle valve is controlled in the close direction, and the torque reduction control that reduces the torque of the internal combustion engine is thereby executed. Further, in execution of the torque reduction control, the air bypass valve is maintained in the close state regardless of the change state of the throttle valve opening degree in the close direction. Accordingly, even in a case where the throttle valve is controlled in the close direction as the torque reduction control in the acceleration shifting, the air bypass valve is not opened and is maintained in the close state, and sufficient acceleration performance may thus be secured in the acceleration shifting.

A second aspect of the present disclosure provides the control device for the internal combustion engine 3 according to the first aspect, the control device which may further include: a driver requesting torque parameter calculation unit (the ECU 2 and step 2 in FIG. 3) that calculates a driver requesting torque parameter (first target intake pressure PBCMDTC) which indicates a torque which is requested by a driver of the vehicle; an internal combustion engine requesting torque parameter calculation unit (the ECU 2 and step 2 in FIG. 3) that calculates an internal combustion engine requesting torque parameter (second target intake pressure PBCMDTQ) which indicates a torque which is requested by the internal combustion engine 3 while the internal combustion engine requesting torque parameter reflects the torque requested by the driver and torque reduction for the torque reduction control; and a torque reduction control determination unit (the ECU 2 and steps 3 and 4 in FIG. 3) that determines that the torque reduction control is being executed in a case where the automatic transmission is shifting and the driver requesting torque parameter is greater than the internal combustion engine requesting torque parameter.

The above driver requesting torque parameter reflects the torque requested from the driver. The internal combustion engine requesting torque parameter reflects the torque reduction for the torque reduction control and so forth in addition to the torque requested from the driver. Accordingly, in execution of the torque reduction control, the driver requesting torque parameter is usually greater than the internal combustion engine requesting torque parameter. In the present disclosure, in a case where a condition in which the automatic transmission is shifting and a condition in which the driver requesting torque parameter is greater than the internal combustion engine requesting torque parameter are simultaneously satisfied, a determination is made that the torque reduction control in the acceleration shifting is being executed. Accordingly, the determination may accurately be made. Consequently, based on the result of the determination, appropriate selection may be made between use of close control of the air bypass valve in the torque reduction control in an acceleration operation and use of open control of the air bypass valve for inhibiting the deceleration surge in conditions other than the torque reduction control.

A third aspect of the present disclosure provides the control device for the internal combustion engine 3 according to the second aspect, the control device which may further include: a torque increase control unit (the ECU 2 and step 33 in FIG. 10) that controls the throttle valve 15 in an open direction in deceleration shifting of the automatic transmission to execute torque increase control which increases the torque of the internal combustion engine 3, and a torque increase control determination unit (the ECU 2 and steps 6 and 7 in FIG. 3) that determines that the torque increase control is being executed in a case where the automatic transmission is shifting and the driver requesting torque parameter is less than the internal combustion engine requesting torque parameter.

In this configuration, in the deceleration shifting of the automatic transmission, the throttle valve is controlled in the open direction in the opposite manner from the above-described acceleration shifting, and the torque increase control that increases the torque of the internal combustion engine is thereby executed. Because the torque increase due to the torque increase control is reflected by the internal combustion engine requesting torque parameter, in execution of the torque increase control, the driver requesting torque parameter is usually less than the internal combustion engine requesting torque parameter. In the present disclosure, in a case where the condition in which the automatic transmission is shifting and a condition in which the driver requesting torque parameter is less than the internal combustion engine requesting torque parameter are simultaneously satisfied, a determination is made that the torque increase control in the deceleration shifting is being executed. Accordingly, the determination may accurately be made.

Figure 9:
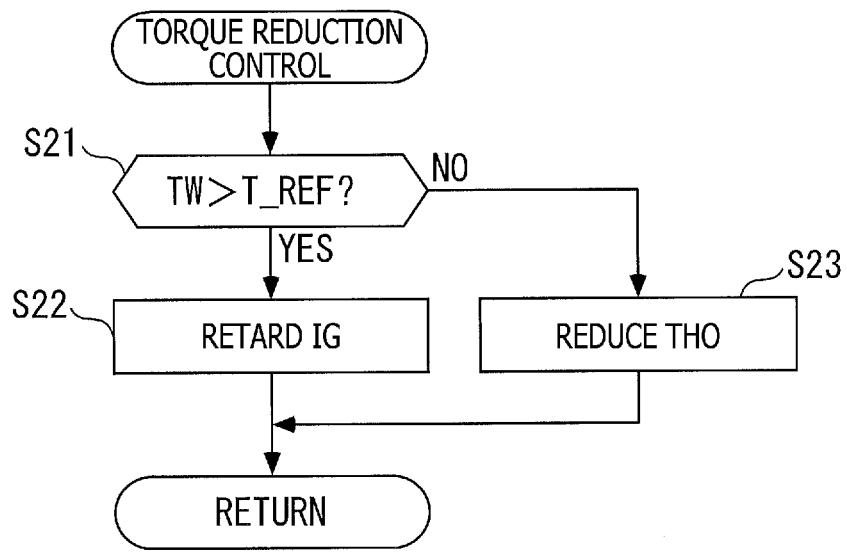
FIG. 9 is a flowchart that illustrates a torque reduction control process.

A fourth aspect of the present disclosure provides the control device for the internal combustion engine 3 according to the first or second aspect, the control device which may further include a temperature parameter detection unit (water temperature sensor 37) that detects a temperature parameter (engine water temperature TW) which indicates a temperature of the internal combustion engine 3, in which the torque reduction control unit may execute control of an ignition timing IG in a retard direction as the torque reduction control in a case where the detected temperature parameter is higher than a prescribed value (prescribed temperature T_REF) (step 22 in FIG. 9) and may execute control of the throttle valve 15 in the close direction as the torque reduction control in a case where the temperature parameter is equal to or lower than the prescribed value (step 23 in FIG. 9).

In this configuration, in a case where the temperature parameter that indicates the temperature of the internal combustion engine is higher than the prescribed value and the internal combustion engine is in a high temperature state, the ignition timing is regarded as the torque reduction control. Accordingly, torque reduction of the internal combustion engine may be performed highly responsively. However, in a case where such retarding control of the ignition timing is performed in a low temperature state of the internal combustion engine, a combustion state is apt to become unstable. Accordingly, in a case where the temperature parameter is the prescribed value or lower and the internal combustion engine is in a low temperature state, control of the throttle valve in the close direction is executed, and the torque reduction control may thereby be performed stably.

Obviously, numerous modifications and variations of the present invention are possible in light of the above teachings. It is therefore to be understood that within the scope of the appended claims, the invention may be practiced otherwise than as specifically described herein.

What is claimed is:

1. A control device for an internal combustion engine that is installed in a vehicle, is connected with a multi-speed automatic transmission, and has a compressor of a supercharger which is provided in an intake path and an air bypass valve which opens or closes a bypass path which bypasses the compressor, the bypass path is a path that connects an upstream side of the compressor to a downstream side of the compressor, the control device comprising:
    a throttle valve opening degree sensor configured to detect an opening degree of a throttle valve which is arranged on the downstream side of the compressor in the intake path; and
    an electronic control unit configured to:
        open the air bypass valve based on a change state of the detected opening degree of the throttle valve in a close direction even when the throttle valve is open; and
        control the throttle valve in the close direction in acceleration shifting of the automatic transmission to execute torque reduction control which reduces a torque of the internal combustion engine,
    wherein the electronic control unit maintains the air bypass valve in a close state in execution of the torque reduction control regardless of the change state of the opening degree of the throttle valve in the close direction.

2. The control device according to claim 1, wherein the electronic control unit is further configured to:
    calculate a driver requesting torque parameter which indicates a torque which is requested by a driver of the vehicle;
    calculate an internal combustion engine requesting torque parameter which indicates a torque which is requested by the internal combustion engine while the internal combustion engine requesting torque parameter reflects the torque requested by the driver and torque reduction for the torque reduction control; and
    determine that the torque reduction control is being executed in a case where the automatic transmission is shifting and the driver requesting torque parameter is greater than the internal combustion engine requesting torque parameter.

3. The control device according to claim 2, wherein the electronic control unit is further configured to:
    control the throttle valve in an open direction in deceleration shifting of the automatic transmission to execute torque increase control which increases the torque of the internal combustion engine; and
    determine that the torque increase control is being executed in a case where the automatic transmission is shifting and the driver requesting torque parameter is less than the internal combustion engine requesting torque parameter.

4. The control device according to claim 1, further comprising:
a temperature parameter detection unit that detects a temperature parameter which indicates a temperature of the internal combustion engine,
wherein the electronic control unit executes control of an ignition timing in a retard direction as the torque reduction control in a case where the detected temperature parameter is higher than a prescribed value and executes control of the throttle valve in the close direction as the torque reduction control in a case where the temperature parameter is equal to or lower than the prescribed value.

5. A control device for an internal combustion engine, comprising:
a throttle valve opening degree sensor configured to detect an opening degree of a throttle valve which is provided downstream with respect to a compressor of a supercharger provided in an intake path of the internal combustion engine which is provided in a vehicle; and
circuitry configured to
open an air bypass valve based on a reduction change in the opening degree of the throttle valve detected by the throttle valve opening degree sensor even when the throttle valve is open, the air bypass valve being configured to open and close a bypass path which bypasses the compressor, the bypass path is a path that connects an upstream side of the compressor to a downstream side of the compressor,
control the throttle valve to reduce the opening degree of the throttle valve while an automatic transmission connected to the internal combustion engine is in an acceleration shifting in order to execute a torque reduction control in which a torque generated by the internal combustion engine is reduced, and
maintain the air bypass valve in a close state during the torque reduction control regardless of the reduction change in the opening degree of the throttle valve.

* * * * *